United States Patent [19]
Battle

[11] Patent Number: 4,509,922
[45] Date of Patent: Apr. 9, 1985

[54] LEGAL EDUCATIONAL GAME AND METHOD OF TEACHING LEGAL SUBJECT MATTER

[76] Inventor: Carl W. Battle, 2681 Mull Ave., Akron, Ohio 44321

[21] Appl. No.: 610,025

[22] Filed: May 14, 1984

[51] Int. Cl.³ .......................... G09B 19/00; A63F 9/18
[52] U.S. Cl. ..................................... 434/322; 273/279
[58] Field of Search ................. 273/257, 279; 434/322

[56] References Cited

U.S. PATENT DOCUMENTS

| | | | |
|---|---|---|---|
| 4,012,045 | 3/1977 | Vail | 273/257 |
| 4,039,192 | 8/1977 | Magiera | 273/257 |
| 4,045,031 | 8/1977 | Arnold | 273/257 |
| 4,068,848 | 1/1978 | Lichtman | 273/257 |

FOREIGN PATENT DOCUMENTS 1534880 12/1978 United Kingdom ................ 273/279

Primary Examiner—William H. Grieb
Attorney, Agent, or Firm—Carl W. Battle

[57] ABSTRACT

A legal educational game and method of teaching legal subject matter wherein said game essentially comprises a legal game board, a plurality of sets of color-coded cards containing legal terminology, and printed instructional means whereby a plurality of participants pull and read said color-coded cards.

4 Claims, 1 Drawing Figure

LEGAL EDUCATIONAL GAME AND METHOD OF TEACHING LEGAL SUBJECT MATTER

BACKGROUND OF THE INVENTION

Many entertainment games and related products are known and available to the public. Although applicant is not aware of the complete scope of the prior art, current games generally provide little or no educational value or intellectual stimulus. Generally, current games are designed solely for entertainment and typically have no practical significance to everyday life. Additionally, games which are educational and which deal with legal subject matter are unknown by applicant to exist in the prior art.

The American public is basically unaware of the workings of the American judicial system. This unawareness is reflected in a general public ignorance of legal rights, procedures and terminology. For example, a survey conducted by the Hearst Corporation in 1983 revealed some alarming statistics relative to the public's unawareness of basic and simple legal concepts. Some results of the survey are as follows:

approximately 50 percent of those surveyed incorrectly believe that a person is guilty of a crime until he proves himself innocent;
 approximately 21 percent of those surveyed believe that they are informed about the court system;
 approximately 55 percent of those surveyed incorrectly believe that the state can appeal a case if a defendant is acquitted of a crime; and
 approximately 45 percent of those surveyed incorrectly believe that the job of the District Attorney is to defend an accused person who cannot afford a lawyer.

The above statistics are presented to show a long-felt need for legal educational methods which are effective in inspiring and teaching legal subject matter to the public.

It is the object of the present invention to provide an effective method for teaching legal subject matter to the public. It is a further object of the present invention to develop an interest on the part of the pubic, particularly minors, in learning legal subject matter. It is an even further object of the present invention to provide a method of teaching legal subject matter which will promote retention and easy recall of said subject matter using legal educational games.

BRIEF DESCRIPTION OF THE DRAWING

FIG. I shows a legal game board with decorative rectangular demarcations for the placement of cards.

SUMMARY OF THE INVENTION

Figure 1:
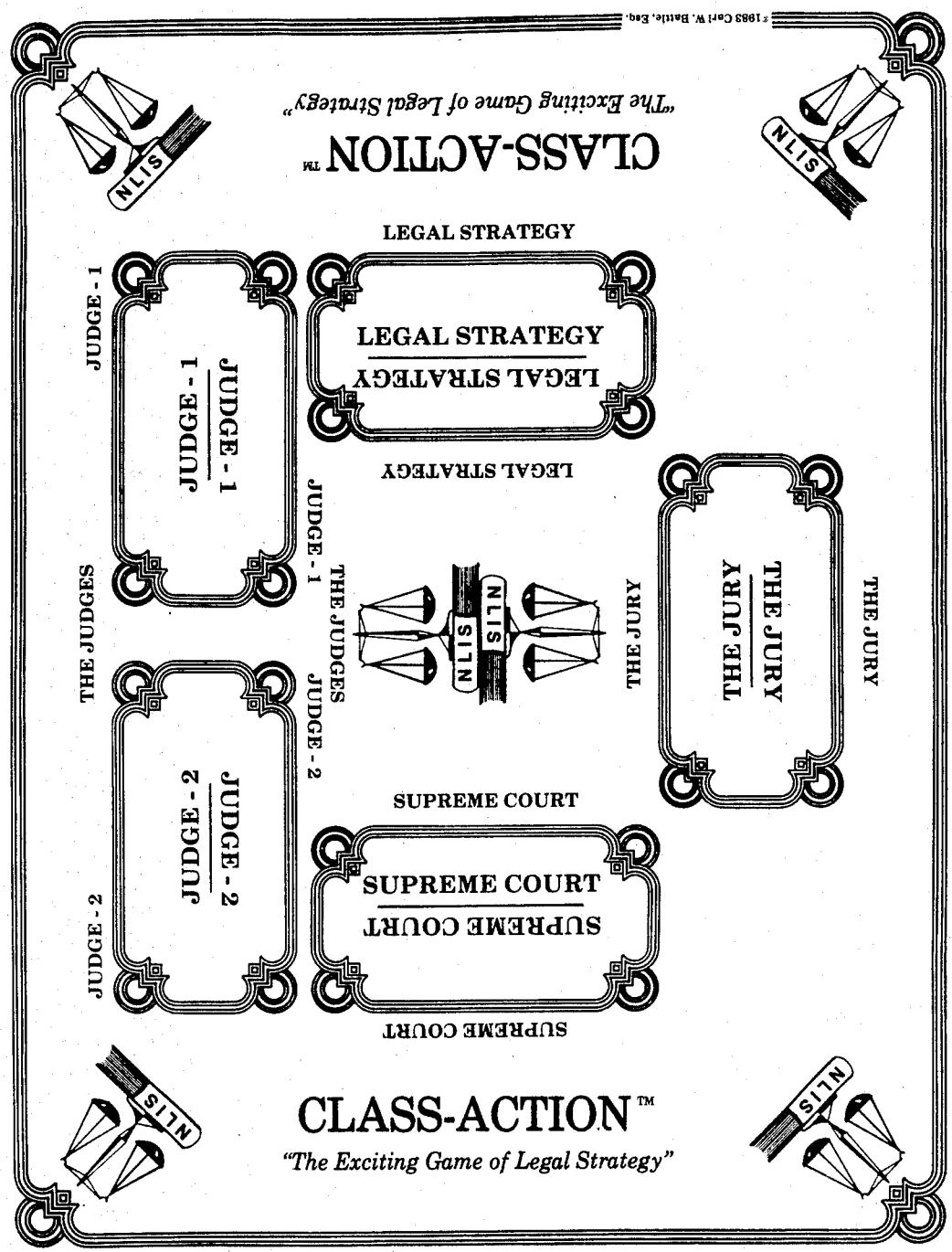

This invention relates to a new and useful legal educational game and method of teaching legal subject matter. The method of this invention essentially comprises (1) using a legal game board which contains demarcations for the placement of cards, (2) using a plurality of sets of color-coded cards which contain legal terminology printed thereon, (3) pulling and reading of the cards by a plurality of participants, and (4) using the legal terminology printed on the cards to cause the participants to pull additional cards.

DETAILED DESCRIPTION

Applicant has invented a new, useful, and unobvious legal educational game and method for teaching legal subject matter. The legal educational game essentially comprises (1) a legal game board, wherein the game board contains demarcations for the placement of cards; (2) a plurality of sets of color-coded cards, wherein the cards contain legal terminology printed thereon; and (3) printed instructional means whereby a plurality of participants pull and read cards, and use the legal terminology printed on said cards to pull additional cards. The method of teaching legal subject matter is carried out utilizing said legal educational game and a plurality of participants.

The method of this invention is preferably carried out in the form of a game involving two or more participants, and more preferably two to six participants, whereby one of the participants ultimately will be declared a winner. The method is practiced utilizing a legal game board which has on its surface demarcations for the placement and holding of cards. The game board preferably has legal terminology printed in or around the demarcations, and more preferably the game board is substantially as shown in FIG. I. The game board can be made of any durable material such as cardboard, wood, plastic, stone, metal or the like. The game board is preferably constructed of cardboard with a 5-15 mil plastic lamination of both sides.

Critical to the practice of this invention is the use of a plurality of sets of cards wherein the cards contain printed legal terminology thereon. The cards should preferably be color-coded with each set of cards being of a different color. The invention preferably involves the use of about 2 to about 5 sets of cards wherein each set of cards represents a segment of the judicial system. The sets of cards should preferably be designated as "the jury", "the judges", "the lawyer", "the supreme court", and "legal strategy".

The legal terminology which is printed on the cards should preferably be simple legal words or phrases. Representative legal terminology includes such words as arrest, bail, appeal, contract, tax audit, assessment, lien, tax exempt, execution, judgmemnt in favor, judgment against, jury, jury selection, libel, negligence, peremptory challenge, remanded, motion, discovery, dismissal, insanity, discharge, truth, assumption of risk, breach, damages, proximate cause, publication, divorce, annulment, desertion, cruelty, duress, impotency, consent, confirmation and the like.

The method is practiced by the participants pulling one or more cards, reading the legal terminology printed thereon, and using the terminology on the pulled cards to pull certain additional cards. In the preferred embodiment of this invention, the participants start the process by the participants pulling one card from the set designated as "the lawyer" or "legal strategy". The method follows a predetermined set of rules utilizing printed instructural means whereby the legal terms printed on the cards have the same effect as in an actual court case. For example, a card having the term "appeal" would cause a participant to advance from a lower court to a higher one; a card with the term "remanded" would cause a participant to proceed back to a lower court; and a card with the term "peremptory challenge" would cause a participant to relinquish a designated number of cards from "the jury" set.

The above method has the advantage of providing to the participants knowledge of legal terms and the simulated effect as in an actual court litigation. This facilitates relatively easy comprehension of legal subject matter. Specifically, the method of this invention is designed to provide an overview of the court system, and to familiarize the participants with legal procedure, legal terminology, and elements of common legal actions.

Although the method of the invention has been herein described in the preferred embodiments, many equivalent embodiments are possible and are intended to be included within the scope of the invention. The method is also subject to computerization whereby the game board and cards may be visually displayed on a television screen or related equipment. Further, a variety of legal subjects may be taught by this method such as, for example, civil law, criminal law, family law, and tax law.

I claim:

1. A legal educational game for minors adaptable for teaching a variety of legal topics essentially comprising in combination
    (1) a plurality of sets of cards each set being of a different color, wherein said cards contain printed thereon simple legal words or phrases, and each of said sets of cards individually represent a segment of the judicial system and contain printed thereon words or markings indicating said segment of the judicial system, said segments selected from the group consisting of the jury, judge, supreme court, lawyer and legal strategy;
    (2) a gameboard means, wherein said gameboard contains a plurality of discrete and discontinuous demarcations which represent segments of the judicial system, and are used for the placement and holding said cards; and
    (3) printed instructional means separate from said gameboard, whereby a plurality of participants pull one or more cards from one or more of said sets of cards, and use the simple legal words or phrases printed on the pulled cards to pull additional cards according to a predetermined non-random system, wherein said simple legal words or phrases have the simulated effect in said game as in an actual court case.

2. A method of teaching legal subject matter utilizing a legal educational game of claim 1.

3. A game of claim 1 wherein the simple legal words or phrases printed on said cards are selected from the group consisting of arrest, bail, contract, tax audit, assessment, lien, tax exempt, execution, judgement, judgement in favor, judgement against, jury, jury selection, libel, negligence, peremptory challenge, remanded, motion, discovery, dismissal, insanity, discharge, truth, assumption of risk, breach, damages, proximate cause, publication, desertion, cruelty, duress, impotency, consent, and confirmation.

4. A game of claim 1 wherein the legal game board is substantially as shown in FIG. I.

* * * * *